UNITED STATES PATENT OFFICE.

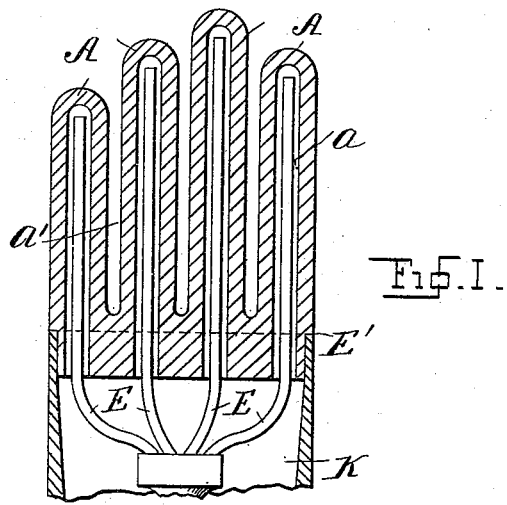
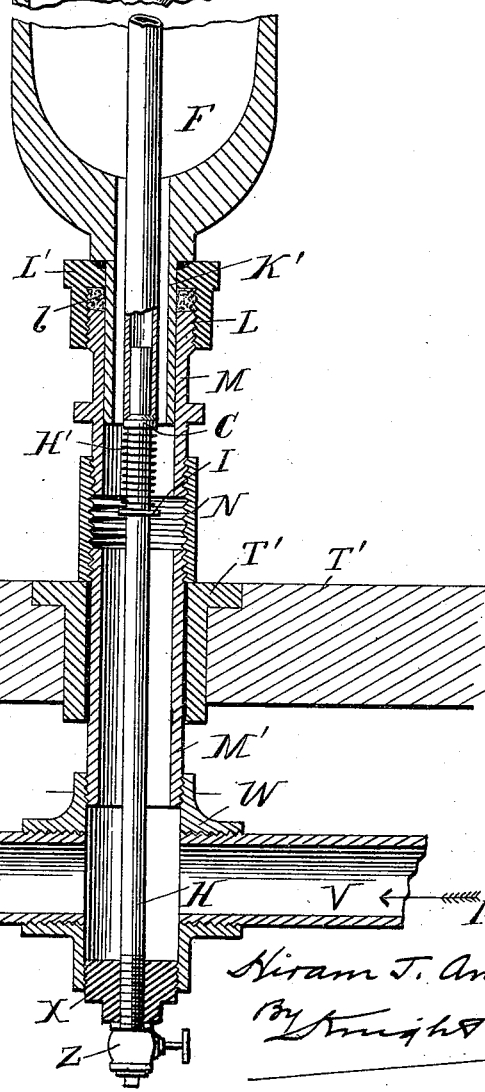
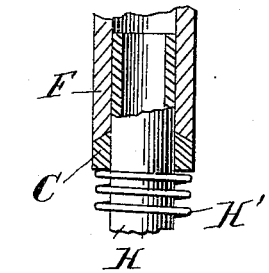

HIRAM J. ANTHONY, OF GLOVERSVILLE, NEW YORK.

STEAM GLOVE DRYING AND FORMING APPARATUS.

SPECIFICATION forming part of Letters Patent No. 550,470, dated November 26, 1895.

Application filed March 11, 1893. Serial No. 465,575. (No model.)

*To all whom it may concern:*

Be it known that I, HIRAM J. ANTHONY, a citizen of the United States, residing at Gloversville, in the county of Fulton and State of New York, have invented certain new and useful Improvements in Steam Glove Drying and Forming Apparatus, of which the following is a specification.

My improvement consists in novel features of construction, hereinafter described and claimed.

Referring to the accompanying drawings, which form a part of this specification, Figure I represents a vertical section of my improved apparatus, and Fig. II is a detail view.

In the accompanying drawings, A A represent the molds for the fingers and are located in what is termed the "finger-section." This section A is provided with a sweat or brazed joint fitting into a corresponding socket in the palm-section K. The finger-section is made of one piece and may be composed of any heat-conducting material of sufficient solidity. The hollow portion $a\ a'$ in the finger-molds may be cored or formed in any other convenient and suitable manner.

The palm-section K is made, preferably, as illustrated, and is constructed of one piece of any sufficiently solid heat-conducting material, but must form a steam-tight joint with the finger-section at E'. This palm-section K has a tubular shank or stem K', provided with a shoulder which rests on the top of the packing-nut L', and is adapted to fit into the tube M. This tube M is screw-threaded at its top and receives the packing-nut L', forming part of the stuffing-box L, which has a filling $l$. When this nut L' is screwed down, the filling is compressed and a steam-tight joint is effected. At the same time the shank or stem K' is free to be turned within the tube M. The object of this rotatable hand-board is to allow the operator to turn the said hand-board into any desired position during the process of finishing the gloves. The tube M is connected by the coupling-ring N to the tube M', which passes through the collar T' in the table T. The tube M' is provided with a union joint or coupling W, attached by means of the screw-joint to its lower end. The steam-feed pipe V is also screwed into this coupling at a right angle to the said tube M'. A plug X is screwed into the lower opening of the union joint or four-way coupling W. This plug X is provided with a tap or air-valve Z. A pipe H is led into the plug X and forms an upwardly-extending continuation of the tap Z and is provided near its upper end with a pin I, above which is located a helical spring H'. This spring extends between the said pipe I and the cap C, said cap supporting the tube F. By means of this construction I secure a perfect joint between the pipe H and pipe F. The tube F extends upwardly into the palm-section K and connects with the smaller and branching independent relief-tubes E. These smaller and branching tubes E extend upwardly within a very short distance of the finger tips or molds A, as shown. The spring H' presses the cap C upwardly against the conical base of the pipe F, thereby adjusting it to the different lengths of said pipe F when the finger-molds are changed.

The operation of my apparatus is as follows: The steam passes from the boiler through the continuous steam-pipe V into the hand-boards that are secured thereto and thence back to the boiler through said pipe V. By passing the steam through this single-pipe system a great economy is effected by reducing condensation to the minimum and keeping the heat in the hand-boards always at the same temperature. In the two-pipe system, leakage, condensation, and an either overheated or insufficiently heated condition of the hand-boards compels the operator to often cease his work. When the steam enters the pipe V, as indicated by the direction of the arrow at the right-hand side of the drawings, it will enter the palm-section K and thence upwardly into the finger-molds and sections A, around the relief-tubes, driving out the air contained in the said sections through the pipes E, and thence outwardly through the pipes F and H through the tap Z. It will be found that on account of atmospheric pressure in the apparatus, which resists the incoming steam, the heat will travel very slowly toward the finger-sections; but if the tap Z is opened so as to permit the air to escape through the relief-tubes E, F, and H the inrushing steam will fill all the pipes and produce almost instantly the required amount of heat. In operating the device, as soon as the dry steam begins to escape from the tap the said tap is closed and the apparatus will retain a uniform temperature until the supply of steam fails.

If either hand-board in the series becomes cooled or is desired to be hotter, the temperature in each one can be raised independently at will by simply opening the escape-valve $z$ until the desired temperature is reached. By this means it is not only possible to immediately heat up any new hand-board which is applied, but it becomes possible to maintain the temperature in each hand-board independently of others, if desired.

Having thus described my invention, the following is what I claim as new therein and desire to secure by Letters Patent:

1. In a glove finishing device, the combination of the rotatable hand board, having a tubular shank, provided with a shoulder, the upper tube M, receiving the shank, and supporting it by its shoulder, the packing nut L, the lower tube M', the spring air tube coupling N, the steam-circulating pipe V, with which the tube M, is connected as an offset, an air valve Z, and tubes leading from the upper ends of the board and connected with said air valve, through the medium of the spring air tube coupling; substantially as described.

2. In a glove finishing device, the combination of the hand board, having a tubular shank, the socket for receiving said shank, the air outlet leading downward from the high points of the board, the coupling for the board, and the coupling for the air pipe consisting of the meeting ends, one of which carries a cap C, and the spring surrounding the lower pipe and holding up the cap; substantially as described.

HIRAM J. ANTHONY.

Witnesses:
HERBERT KNIGHT,
M. V. BIDGOOD.